(12) United States Patent
Kheder (10) Patent No.: US 12,114,800 B2
(45) Date of Patent: Oct. 15, 2024

(54) SUSTAINABLE VESSEL FOR INFUSING CONSUMABLE PRODUCTS

(71) Applicant: Alex Kheder, Anaheim, CA (US)

(72) Inventor: Alex Kheder, Anaheim, CA (US)

( * ) Notice: Subject to any disclaimer, the term of this patent is extended or adjusted under 35 U.S.C. 154(b) by 0 days.

(21) Appl. No.: 18/506,275

(22) Filed: Nov. 10, 2023

(65) Prior Publication Data
US 2024/0156296 A1     May 16, 2024

Related U.S. Application Data

(60) Provisional application No. 63/424,564, filed on Nov. 11, 2022.

(51) Int. Cl.

| A47J 31/20 | (2006.01) |
|---|---|
| A47J 31/06 | (2006.01) |
| B65D 25/16 | (2006.01) |
| B65D 25/20 | (2006.01) |
| B65D 43/14 | (2006.01) |
| B65D 85/00 | (2006.01) |
| B65D 85/812 | (2006.01) |
| A47J 31/40 | (2006.01) |

(52) U.S. Cl.
CPC ........... *A47J 31/20* (2013.01); *A47J 31/0636* (2013.01); *B65D 25/16* (2013.01); *B65D 25/20* (2013.01); *B65D 43/14* (2013.01); *B65D 85/70* (2013.01); *B65D 85/812* (2013.01); *A47J 31/407* (2013.01); *B65D 2543/00092* (2013.01)

(58) Field of Classification Search
CPC .. A47J 31/407; A47J 31/0636; A47J 31/0626; A47J 31/20; B65D 85/812; B65D 85/8085; B65D 85/808; B65D 85/8061; B65D 85/8043
USPC ................................ 99/322, 306; 426/83, 82
See application file for complete search history.

(56) References Cited

U.S. PATENT DOCUMENTS

| 187,407 | A | * | 2/1877 | O'Connor ...................... 99/322 |
|---|---|---|---|---|
| 397,257 | A | * | 2/1889 | Tarring ........................... 99/322 |
| 528,594 | A | * | 11/1894 | During ............................ 99/322 |
| 8,221,813 | B2 | * | 7/2012 | Boul ....................... A47J 31/08 |
| | | | | 426/594 |
| 8,967,038 | B2 | | 3/2015 | Rivera |
| 9,668,604 | B2 | | 6/2017 | Yoakim |
| 10,611,507 | B2 | | 4/2020 | Trombetta et al. |
| 11,724,873 | B2 | | 8/2023 | Lach et al. |

(Continued)

FOREIGN PATENT DOCUMENTS

| CN | 215348383 U | 12/2021 | |
|---|---|---|---|
| DE | 1207866 | * 12/1965 | ........... B65D 85/812 |

(Continued)

*Primary Examiner* — Reginald Alexander (57) ABSTRACT

An apparatus pertains to a product preparation featuring a permeable body comprising an extraction chamber(s), along with a flexible, free-motion mechanism structure appropriately coupled to the body. The apparatus is equipped with a sealing mechanism at an opening, allowing for the insertion of a predetermined portion of ingredients. In some embodiments, to enhance filtration, a sleeve filter may be inserted within the container. When the container is submerged in a vessel to a level suitable for extracting a beverage, it securely affixes to the inner wall of the vessel through the flexible structure. The depth within a vessel is adjustable to control the product quality.

12 Claims, 7 Drawing Sheets

(56) References Cited

U.S. PATENT DOCUMENTS

| | | |
|---|---|---|
| 2013/0233177 A1 | 9/2013 | Lambert |
| 2014/0272018 A1 | 9/2014 | Koller et al. |
| 2017/0303712 A1 | 10/2017 | Pisarevsky |
| 2023/0284816 A1 | 9/2023 | Freire Falcão et al. |

FOREIGN PATENT DOCUMENTS

| | | | | |
|---|---|---|---|---|
| EP | 2306871 B1 | 7/2012 | | |
| EP | 2912948 B1 | 5/2017 | | |
| GB | 2491445 A | * 12/2012 | ........... | B65D 85/812 |

\* cited by examiner

001# SUSTAINABLE VESSEL FOR INFUSING CONSUMABLE PRODUCTS

REFERENCE TO RELATED APPLICATIONS

This application claims the benefit of U.S. Provisional Patent Application No. 63/424,564 filed on Nov. 11, 2022 which is incorporated by reference herein in its entirety.

BACKGROUND OF THE INVENTION

Each year, a staggering 56 billion disposable coffee capsules pollute our landfills, contributing 576,000 metric tons of waste and posing a significant environmental challenge. However, imagine a world where only 100 million individuals choose a more sustainable path. This design presents a compelling alternative, by offering a convenient and eco-conscious solution. With only a 100 million users, it has the potential to eliminate 4.6 billion disposable capsules annually, translating to 38,000 fewer metric tons of landfill waste. This significant reduction contributes to a more sustainable future and paves the way for a greener planet.

The following background discussion is not an admission that anything discussed below is citable as prior art or common general knowledge.

The use of a vessel, container, pod and capsule may be interchangeable throughout this document and either one may be sufficient to deliver the final desired product and results.

A single or multiple serve pod for use to prepare a favorite consumable product through infusion are becoming increasingly popular and are the desired method to prepare top quality products. Such pods come in a variety of formats containing ingredients for producing beverages such as coffee, tea, hot chocolate or soup broth, etc.

Capsule machines typically include an injection system for injecting a fluid, such as hot water, into a capsule for mixing with ingredients disposed within the capsule to prepare a desired consumable product. A dispensing system may also be provided to dispense the prepared product from the capsule for delivery to a receptacle such as a user's cup or vessel.

Challenges of conventional machines and their pre-packaged capsules include:

Difficulty controlling how ingredients are exposed to the injected fluid and the mixing time needed to achieve desired results.

insufficient ingredient quality and freshness in pods.

Excessive cost and complexity of manufacturing results in excessive retail cost.

A challenge of proliferating mold, clogging and cleaning of machines.

An immense overlooked environmental impact of uncontainable discarded capsules, with an estimated 55-65 billion capsules ending up in landfills annually.

Therefore, there is an urgent need for a more efficient, safe, environmentally friendly and affordable way to extract quality product from ingredients into common drinking vessels without the need for expensive machines or pre packed capsules.

It is the objective of the present invention to address these problems and provide a novel type of container to extract consumable products and overcome all the disadvantages present, we created a fully reusable universal pod that is environment friendly, non-disposable, low-cost to manufacture, shelf-life stable, and refillable and reusable indefinitely.

PRIOR ART

Single-serve coffee capsules offer convenience and quality, but their environmental impact cannot be ignored.

These capsules contain pre-measured ingredients for brewing coffee, tea, and other beverages. The capsule flow involves injecting hot water into the capsule, extracting the beverage and dispensing it into a cup. While capsule machines offer convenience and efficiency, their environmental impact is significant. The production of capsules and their associated packaging contributes to energy consumption, resource depletion, and waste generation. A staggering 576,000 metric tons of coffee capsules are discarded annually, often ending up in landfills, posing long-term environmental concerns.

Existing prior art, such as U.S. Pat. No. 9,371,177B2 and U.S. Ser. No. 10/611,507B2, has attempted to address the quality of the finished product, but never concerns about waste to the environment. Therefore, the environmental impact of single-serve coffee capsules remains significant.

Manufacturers are now exploring more comprehensive and sustainable alternatives, such as developing capsules made entirely from compostable materials and implementing recycling programs to ensure that used capsules are properly disposed of.

OBJECT OF THE INVENTION

It is the objective of the present invention is to address disposable beverage container problems and provide a novel type of container to extract consumable products and overcome all the disadvantages present. We created a fully reusable universal pod that is environment friendly, non-disposable, low-cost to manufacture, shelf-life stable, and refillable and reusable indefinitely.

SUMMARY OF THE INVENTION

The invention provides a container for use in vessels for preparing consumable products from ingredients through immersion in liquid. A reusable pod consisting of a permeable body with an internal space and an opening, a coupled lid to cover the body, a permeable sleeve to fit inside the pod, a flexible structure coupled to the body of the pod that provides random flexibility to expand and contract into the surrounding space. Ingredients are enclosed in the sleeve inside the pod, and securely positioned inside a vessel using the flexible mechanism. The pod is then submerged in a liquid to prepare the desired consumable product.

In another aspect, the invention provides a sustainable pod for use in vessels for preparing consumable products from ingredients. The pod consisting a body with permeable surface, may have a bottom and a top, to define an interior space with an opening, a flexible structure coupled to the outside of the pod. Ingredients disposed and secured inside the pod, thereafter it is securely positioned within a vessel. The pod is immersed in a liquid for preparing a consumable product.

In another embodiment, the container is consisting of a permeable body defining an interior space with an opening; a flexible structure coupled to the outside of the pod; a sachet suitable to hold ingredients. Ingredients disposed and secured in said sachet, are then is inserted into the pod with a cover to seal the opening. The pod is securely positioned inside a vessel and immersed in a liquid to prepare a consumable product In another aspect, the invention provides a flexible structure suitable to clasp a sachet fillable with ingredients. The structure is consisting of flexible elements to secure it inside a vessel to prepare consumable products. The structure is designed to tightly hold the sachet using a fastening mechanism to keep the ingredients contained. The ingredients are placed inside the sachet, which is then fastened shut and securely attached to the flexible structure, to ensure it fits snugly inside a vessel.

In another aspect, the flexible structure consists of a set of manipulative elements designed to adjust to variable interior dimensions and shapes of vessels, integrated with a mechanism that reacts to applied force, allowing for flexible placement inside.

The mechanism of the flexible structure may utilize an array of components, including, but not confined to, lattices, voxels, flexible mechanical metamaterials, and joints, etc. to control the structure, a manipulation mechanism can leverage tools like levers, rings, clamps, and similar devices.

A lever for the operation and manipulation of the pod can be as part of the pod or as part of the flexible structure. The coupling between the lever and the structure can be designed to control the function of contraction of the structure's framework during operation. Such function is by pulling, hence the structure narrows, enabling its insertion into a vessel. Upon release of the lever, the structure reverts to its original position to secure it snug inside the vessel.

All embodiments leverage the displacement of the elements of the flexible structure. The structure slightly decompresses when placed inside a vessel, which creates a reactive tension sufficient to instantaneously pin the structure snugly inside a vessel. The flexible structure pinned inside a vessel eliminates all movement, shaking, and rattling of the pod or sachet, which could cause splashes and burns.

The flexible structure consists of plurality of elements extended outwardly, and placed proximately to provide an appropriate force to secure a container inside common vessels.

The container, pod or capsule design is not limited to a specific shape or size, and may adopt unlimited range of designs such as sports shapes, figurines, geometrical shapes and characters.

The pod design may also incorporate messages and logos, etc.

The flexible structure may implement a mechanical mechanism to achieve proper movement to secure the pod inside a variety of vessels. The mechanism manipulates the function of the structure to be smoothly placed and secured inside the vessel. Other aspects of the proposed flexible structure include a self-sustained reactive mechanism that utilizes the buildup of tension, this mechanism allows the structure to operate in a variety of ways without limiting its scope or function.

Other aspects and features of the teachings disclosed herein will become apparent, to those ordinarily skilled in the art, upon review of the following description of the specific examples of the specification.

BRIEF DESCRIPTION OF DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

BRIEF DESCRIPTION OF FIGURES

DETAILED DESCRIPTION

Various apparatuses or methods will be described below to provide examples of the invention. The invention is not limited to apparatuses or methods having all of the features of any one apparatus or method described below or to features common to multiple or all of the apparatuses described below. The invention proposes a concept which may reside in a combination or sub-combination of the apparatus elements, mechanisms, methods, or steps described below. It is possible that an apparatus described below is not an example of the proposed invention. The applicant, inventor, and/or owner reserve all rights in any invention disclosed in an apparatus or method described below that is not proposed in this document and do not abandon, disclaim or dedicate to the public any such invention by its disclosure in this document.

Figure 1:
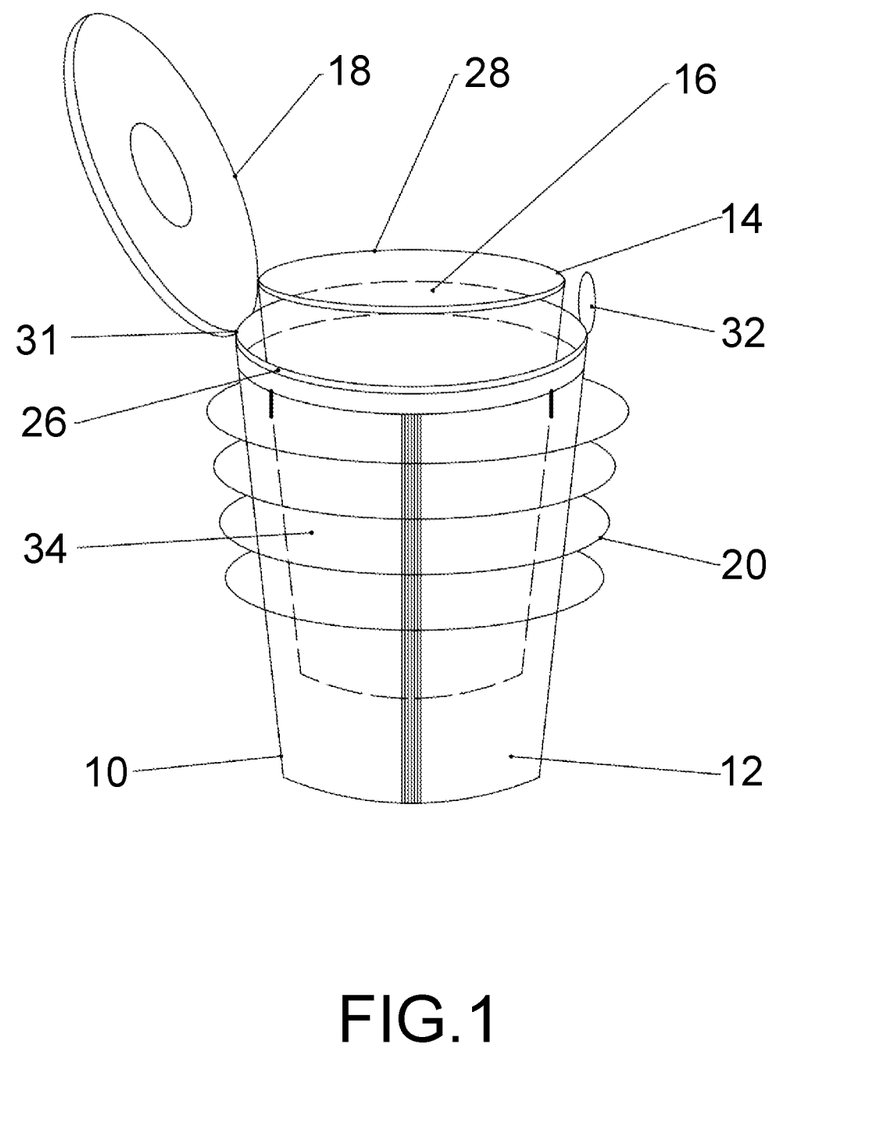
FIG. 1. is a view of a pod with a sleeve filter insert of an extraction apparatus.

FIG. 1. A pod in accordance with the present invention is shown generally as 10 in the figures. pod 10 includes a body 12, a sleeve 14 when required, a flexible structure 20, ingredients 16, a sealing cover 18 when required and a lever 32. Pod 10 can be sized to provide a single serving or multiple servings of a desired consumable product. The Pod is substantially adequate to be secured inside a common vessel of diverse sizes and shapes. The pod can be of variable designs, shapes and sizes, all of which substantially suitable for the anticipated extraction function to produce a consumable product without limitations.

The flexible structure 20 adapted to flex liberally and decompress to snugly secure the pod within the interior surface of a vessel. The structure can be provisionally or permanently coupled to the pod without interfering with its main function. It is appropriately free to react flexibly in random motion to accommodate the interior of variable vessels without limitations. A cover or seal 18 is utilized to dispense ingredients into and remove them from the pod. The cover or seal 18 can be coupled to the pod and secured using a variety of suitable mechanisms such as a flip cover, a twist, a slide, a screw, a hinge, or clamp or any commonly known mechanism.

The body 12 of pod 10 may include a permeable sidewall 34 that defines an interior space, and also may contain permeable top and bottom. An opening 28 may be defined at one end of body 12, but not limited to that, and a flange 26 for added durability may extend around the periphery of the opening 28 for easy handling and strength, a lever 32 is utilized for handling. The flexible structure 20 is appropriately coupled to the pod 10.

The Pod design is suitable to incorporate common or unique shapes such as geometrical shapes, sports shapes, commercial brand shapes, logos and popular characters shapes and such. The pod is also suitable to incorporate and utilize brand names and logos for promotion or brand recognition.

Figures 2A, 2B:
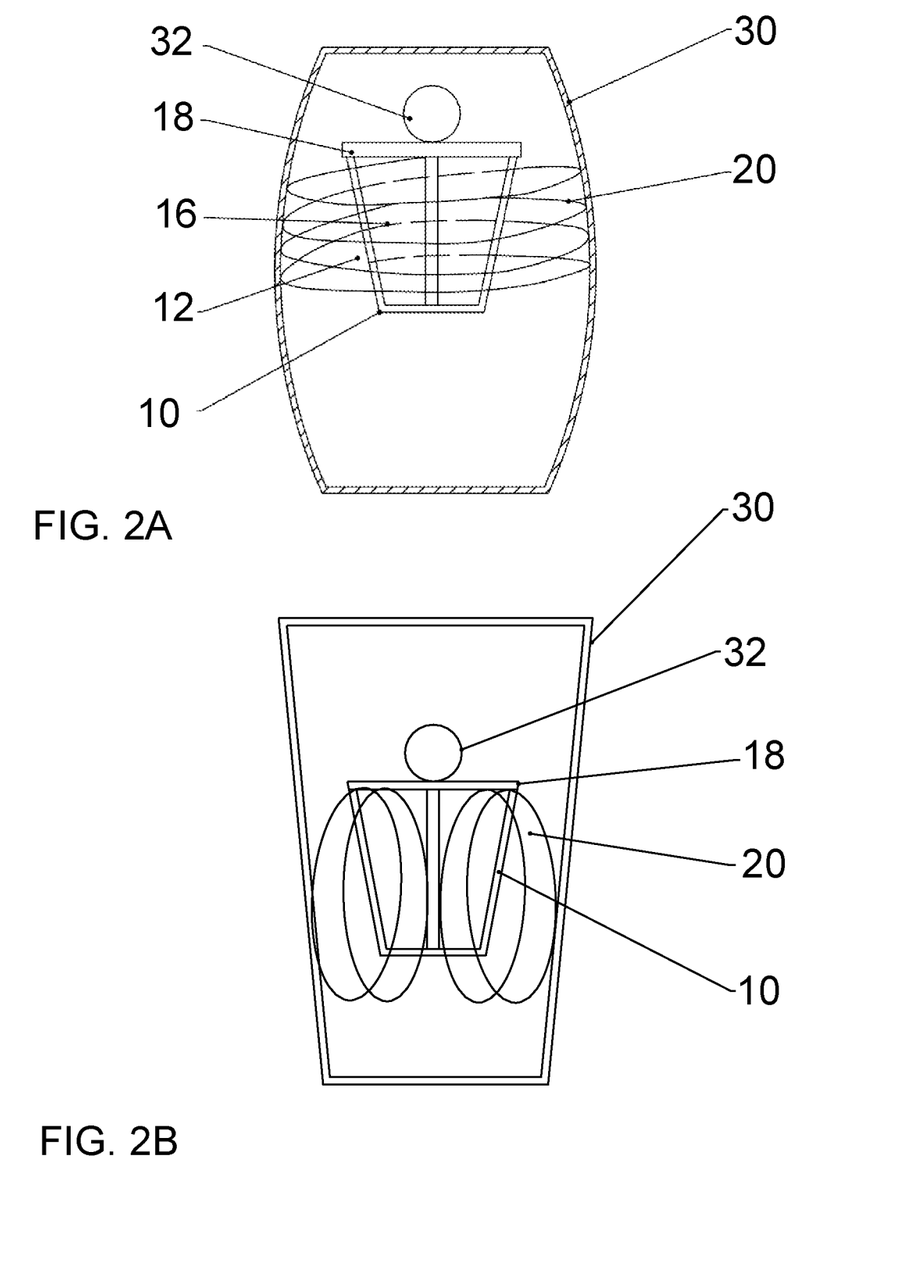
FIG. 2A. is an embodiment of a pod design in accordance with the present invention.
FIG. 2B. is an embodiment of a pod design in accordance with the present invention.

FIG. 1. Shows a pod 10 with a cover on top end 18 and a flexible structure 20 shown here as a spherical loop suitably coupled to the body of the pod 10. The loop 20 conveniently squeezes as it is inserted inside a vessel. The reactive compression of the flexible loop structure 20 will snugly secure the pod 10 to the interior wall of the vessel. The snugly secured pod inside a vessel prevents shaking, splashing or rattling during mobility or consumption of the produced product. FIG. 2A. Presents a pod 10 is secured within a vessel 30, it has a cover 18 and a flexible structure shown here as a spherical loop 20. The loop 20 conveniently squeezes as pressure applied against it. The build up pressure of structure 20 secures the pod 10 to the inside wall of the vessel 30 to prevent shaking and rattling.

FIG. 2B. shows another embodiment of a pod 10 secured within a vessel 30, coupled to the pod a flexible structure 20 comprising a plurality of flexible protrusions such as tentacles. The structure can react freely and decompress to suitably snugly secure the pod snugly to the interior surface of the vessel 30.

Figure 3A:
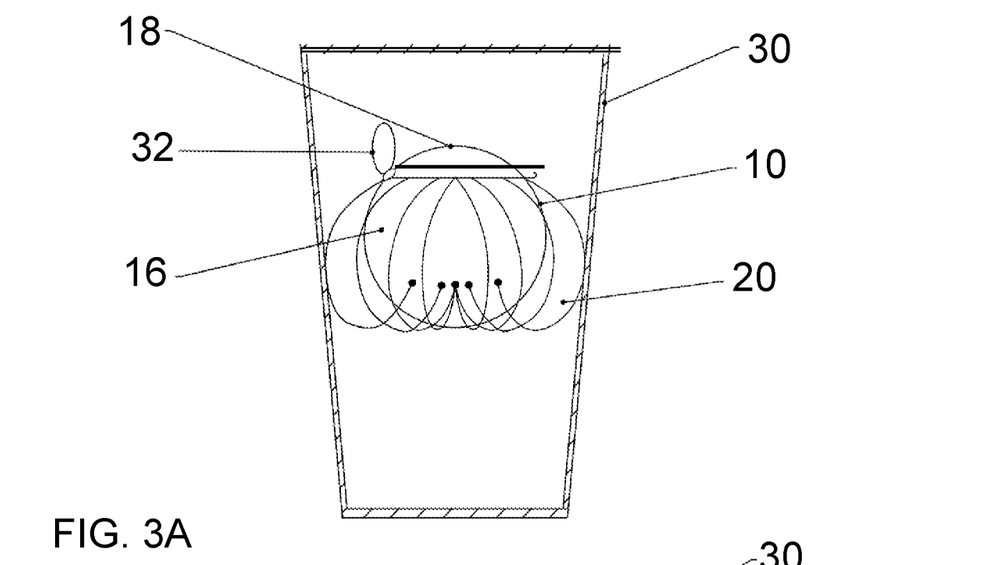
FIG. 3A. is an embodiment of a pod design in accordance with the present invention.

FIG. 3A. shows an embodiment as a sphere-shaped pod 10 secured inside a vessel 30 with a flexible structure consisting plurality of flexible arms 20.

Figure 3B:
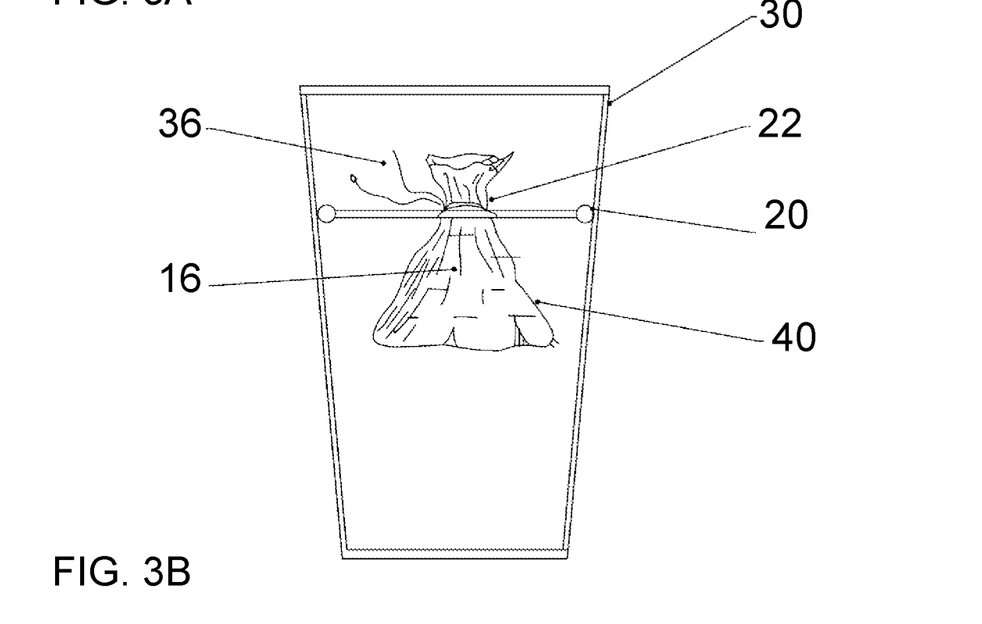
FIG. 3B. is an embodiment of a pod design in accordance with the present invention.

FIG. 3B. shows an embodiment having a flexible structure 20 secured within a vessel 30 suitable for holding a sachet 40 filled with ingredients 16. The flexible structure 20 has a mechanism 22 suitable to secure the sachet 40 filled with ingredients 16. The structure 20 is able to hold the sachet and securely pin it within a vessel 30. The structure 20 holds the sachet filled with ingredients through any common securing mechanism 22 such as a clamp, or a pin. Thereafter it is immersed in a liquid to infuse a consumable product.

A neutral binder material may be used within sachets 40 without adding any measurable flavor, odor, sensory, health benefit, or function to the consumable product. After the ingredients are disposed into sachet 40, a drawstring or other common sealing mechanism 36 may be utilized to properly seal the sachet opening.

Figure 4A:
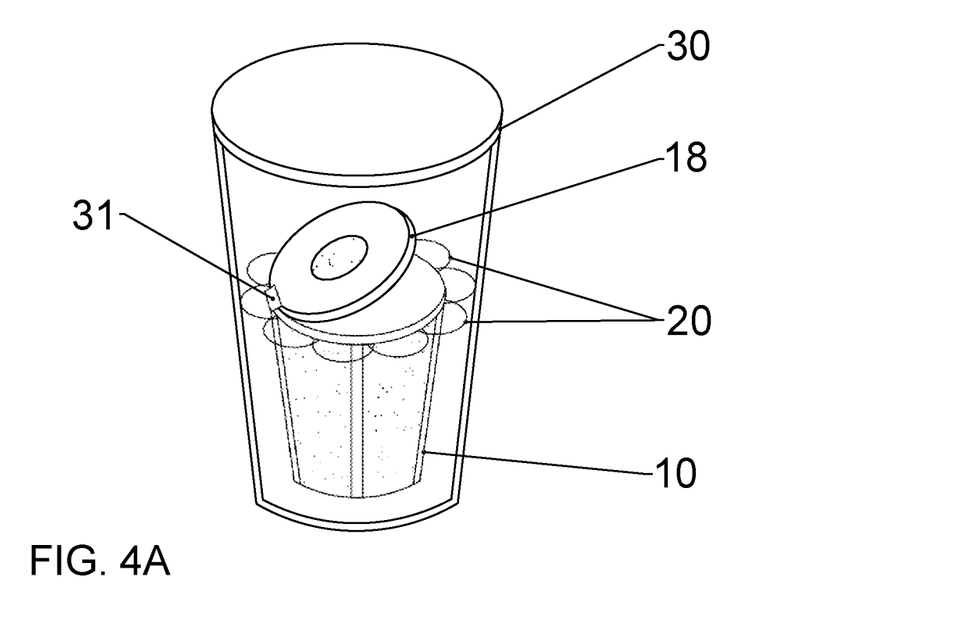
FIG. 4A. a view of an alternate design of a pod with an alternate flexible structure.

FIG. 4A Presents a pod 10 with a cover 18 at its top end having a flexible structure 20 featuring a plurality of geometrical arc-shaped elements coupled proximately to the body of the pod 10.

When the structure 20 pressed against the interior of a vessel 30, it triggers the decompression of the flexible elements within. This action snugly secures the pod within a vessel, effectively preventing shaking, splashing and rattling.

Figure 4B:
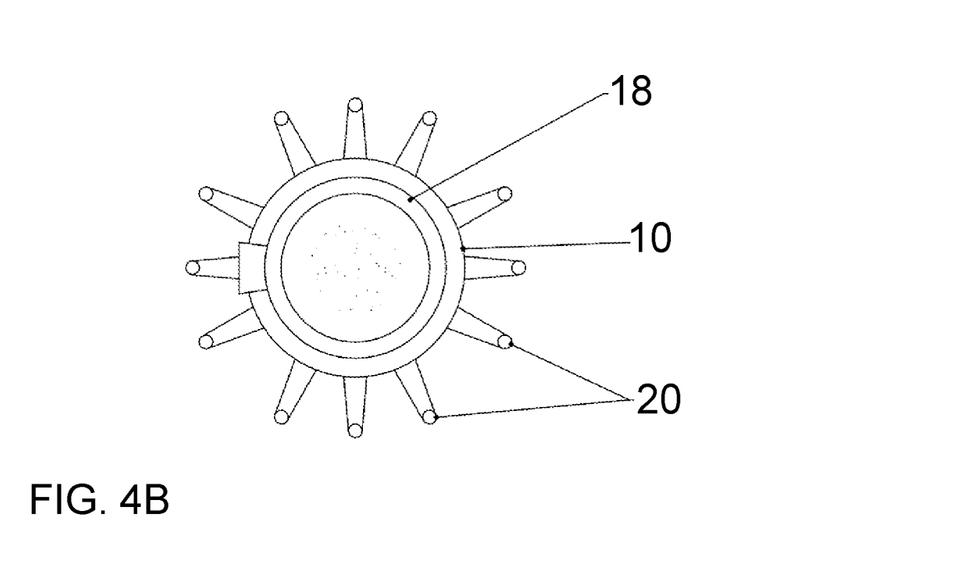
FIG. 4B. a top view of an alternate design of the flexible structure.

FIG. 4B. is a top view of a pod featuring a flexible structure consisting of plurality of flexible protruding spikes shown as 20 coupled to the body of the pod. These spike-like elements are strategically positioned along the body of the pod 12 to flex and activate upon contact with the inner wall of a vessel 30, effectively securing the pod firmly within the vessel.

Figure 5A:
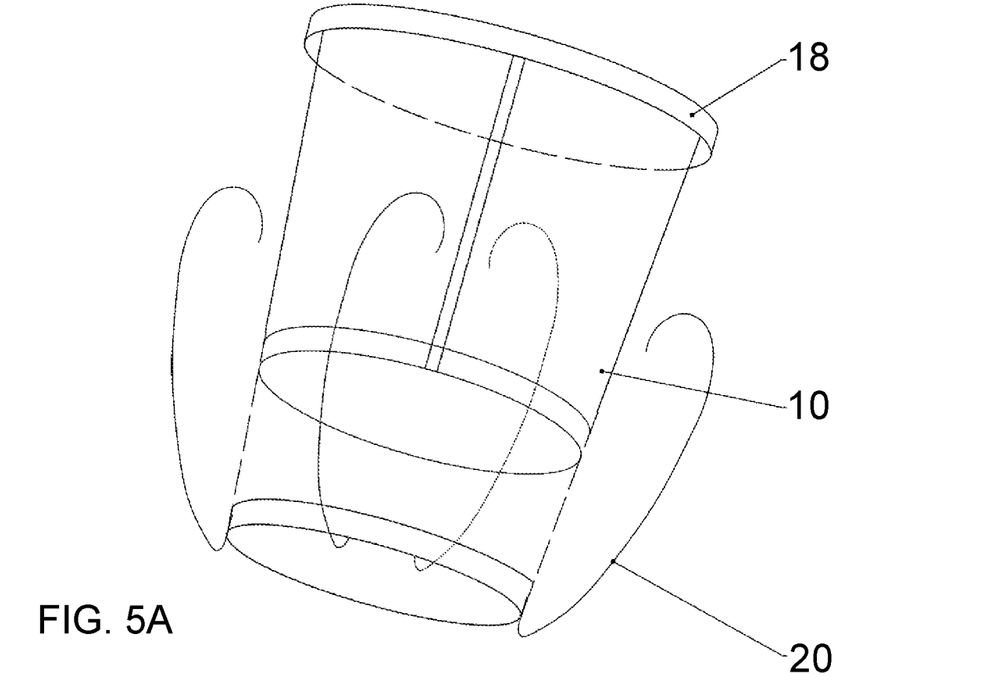
FIG. 5A. an alternate design of a pod with an alternate design of the flexible structure.
Figure 5B:
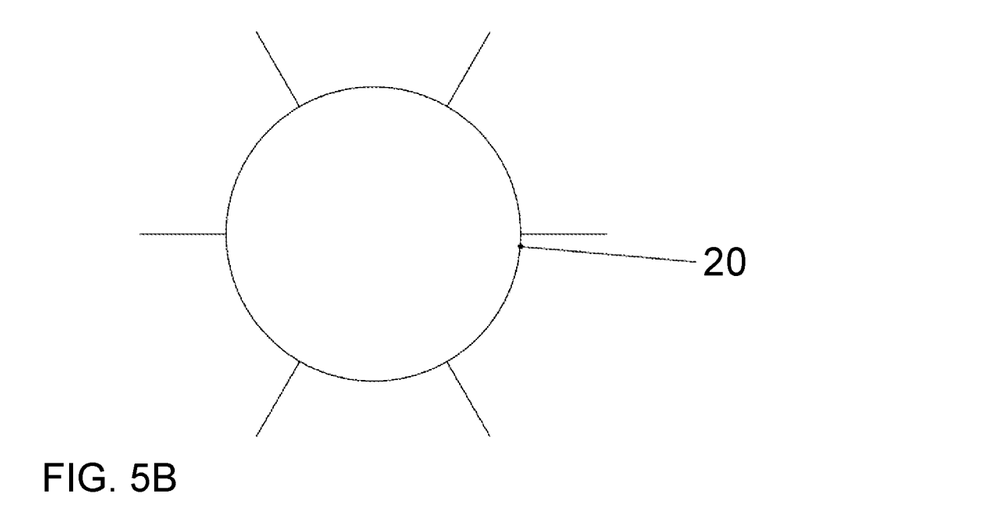
FIG. 5B. a top view of the flexible structure used in FIG. 5A.

FIG. 5A, and FIG. 5B. are in some embodiment of a pod encompasses various facets of a flexible structure composed of plurality of element designs intended for use.

Figure 6A:
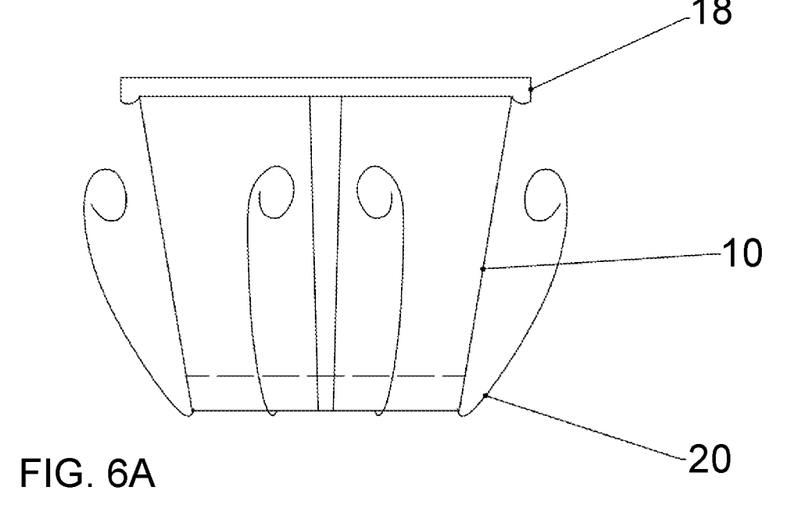
FIG. 6A. another view of a pod with an alternate design of a flexible structure.
Figure 6B:
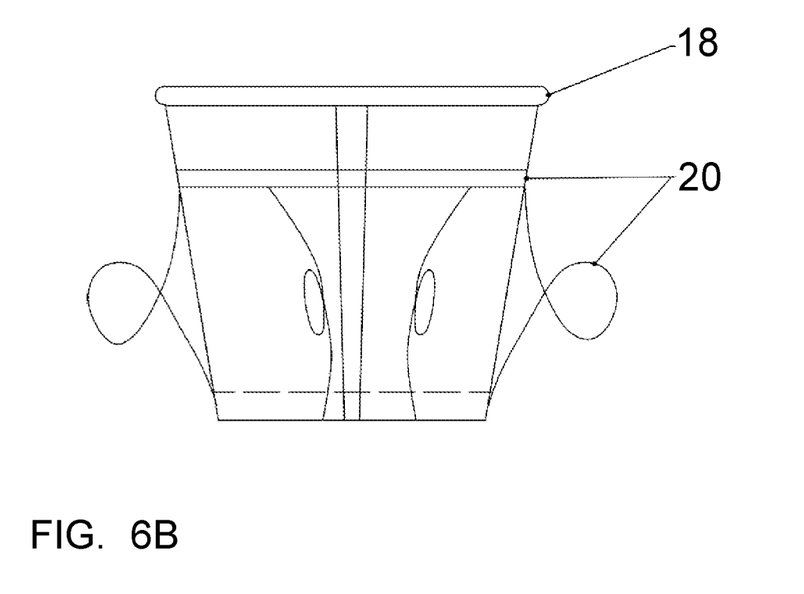
FIG. 6B. an alternate design of a pod with an alternate design of the flexible structure.

FIG. 6A, and FIG. 6B. are in some embodiment of a pod encompasses various facets of a flexible structure composed of plurality of element designs intended for use.

The flexible structure is three-dimensional, designed to move freely, it is comprised of numerous flexible elements, typically three or more, strategically coupled to the body to approximately surround its periphery for contact within its designated space. This structure is intended to expand and contract randomly, responding dynamically to external and other forces or stimuli.

The diverse flexible structure designs depicted in the drawings serve as suggested examples that can be modified in various ways to achieve a similar outcome of securing the pod inside a vessel. All the illustrated designs of flexible structures are labeled as 'Numeral 20'. The flexible structure consists of assembled components to form variable mechanical structure for securing the pod within a vessel.

Figure 7A:
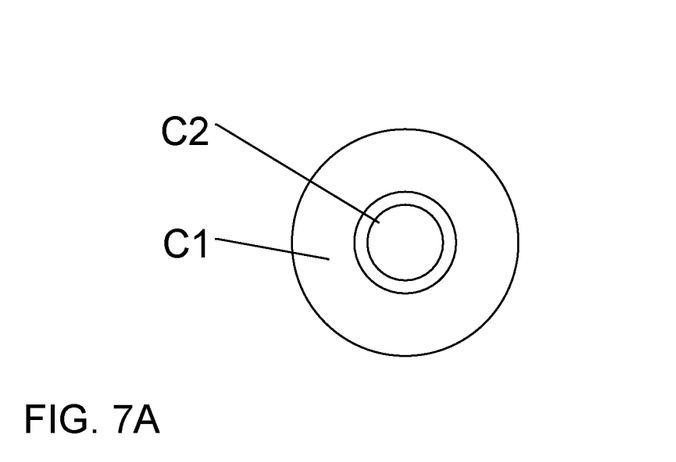
FIG. 7A. top view of an alternate design of a pod with multiple interior chambers.
Figure 7B:
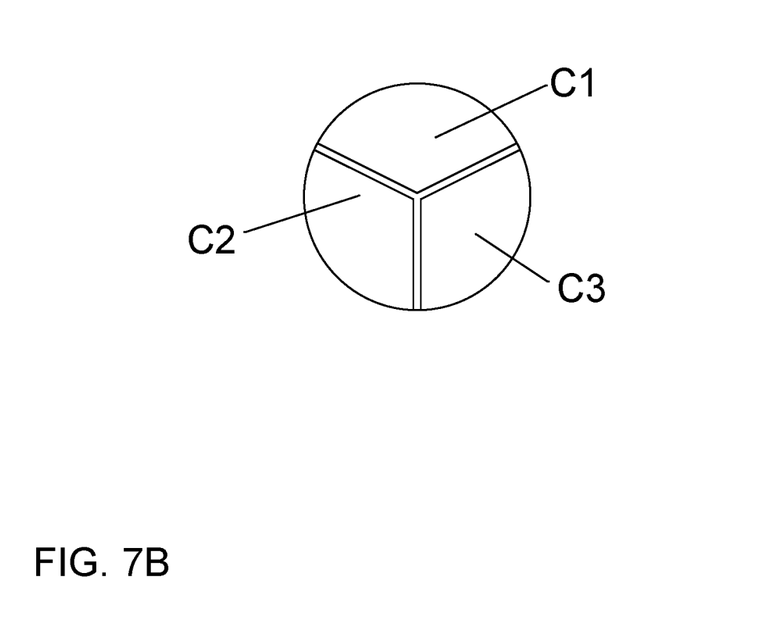
FIG. 7B. top view of an alternate design of a pod with multiple interior chambers.

FIGS. 7A and 7B. show a pod 10 may have multiple internal chambers to accommodate one or more ingredients. The permeability of the chambers (C1, C2, C3, etc.) can be full or partial, as needed. The orientation, number, and design of the chambers can vary depending on convenience and the intended function of the container.

FIG. 7A shows within the primary chamber C1, a centrally located chamber C2 exists. The ingredients contained within C2 are subject to lower exposure to the immersing liquid compared to the ingredients in C1. Consequently, this results in a decreased infusion of ingredients in C2. FIG. 7B shows an example of a pod with three chambers: C1, C2, and C3.

In another aspect, the sleeve insert 14 referenced in FIG. 1 may be adapted to be disposed within body 12, creating one or multiple ingredient compartments designed for containing one or multi ingredients 16. These ingredients, particularly insoluble ones such as coffee grounds or tea leaves. In various embodiments, the pod 10 can be introduced seamlessly with or without the insert 14. The inclusion of insert 14 provides the option of employing pre-filled inserts with ready to use ingredients for later use.

Moreover, the characteristics of the chambers can influence the density, cohesion, delayed release, and other physical properties of ingredient 16.

Pod 10 is made of a size, shape and configuration for use in a common vessel 30 for preparing consumable products. Typically, hot or cold liquid is added within a vessel 30 to submerge pod 10, which can contain various ingredients 16. The quality of the finished product is determined by the duration of the extraction process. Brewing products via infusion and extraction represents the most practical and efficient method of achieving desirable results, such as obtaining a concentrated strength and desired temperature of the finished product. This extraction may be facilitated via a pod design featuring permeable bottom, top, sides, or any necessary combination thereof.

Ingredient 16 may include soluble or insoluble material, preferably insoluble. Ingredients 16 are provided in a dry state, but may be in other suitable states. Insoluble ingredients may include tea leaves, coffee grounds, herbs, or other ingredients that are adapted for forming a consumable product by extraction or infusion. Ingredient 16 may also include active ingredients such as foaming agents, natural health additives, regulated drugs, or other soluble or insoluble ingredients.

Alternatively, active or functional ingredients, or food flavors, may be added separately from the main ingredients to enhance certain flavors in the final product.

All embodiments, including pods, capsules, and incorporated design elements, are made from appropriate materials that are heat and corrosion resistant as well as conform to the guidelines of food safe materials.

The pod is being adapted to regulate the quality of consumable product based on immersion time in the liquid. The immersion time is managed by the pod's depth placement within the vessel, which directly corresponds to the duration of immersion. A higher placement within the vessel results in a lighter drink, as the liquid decreases due to consumption. conversely, a deeper placement equates to an extended immersion time and a stronger drink. The pod can be adjusted using the lever 32.

The proposed pod can be designed in a myriad of shapes, designs, and sizes, encompassing sports figures, geometrical figures, commercial brand emblems, logos, and popular characters. The pod may integrate and utilize brand names and logos as a means of promotion and enhancing brand recognition.

While the preceding description provides examples of one or more processes or apparatuses, it's important to note that other processes or apparatuses may also fall within the scope of this concept.

It's essential for those skilled in the field to appreciate that this invention is not necessarily restricted to the specific details of the foregoing mentioned illustrative embodiments. The present invention has the potential to encompass various other embodiments or specific forms without losing its fundamental nature or essential attributes thereof.

What is claimed is:

1. An apparatus for infusing products comprising:
   a flexible structure having extended geometrical flexible protrusions; and
   a container with designed permeable sections on its surface, having an interior cavity with designed shape and volume; and
   a container opening with an incorporated coupled sealing mechanism;
   the flexible structure having a multitude of more than four extended geometrical flexible protrusions beyond the structure for counterbalancing the container within a vessel; wherein said flexible structure is coupled to the container at an end or intermediate section; further wherein said flexible structure surrounds the entire periphery of said container, wherein the extended geometrical flexible protrusions respond freely to forces by expanding and contracting; and said flexible protrusions are positioned to provide secure contact at a multitude of more than four locations within said vessel's interior, the container is adapted to receive and seal ingredients through its opening thereafter inserted into said vessel, where its flexible structure conforms to the interior of said vessel, ensuring secure contact with said multitude of locations in said vessel, ideal for an infusion process.

2. The container of claim 1 further comprising geometric and nonstandard design shapes and sizes.

3. The container of claim 1 further comprising: permeability designed surface; and textured or patterned designed surface for enhanced infusion, esthetics and manufacturing.

4. The container of claim 1 further comprising a sealing mechanism selected from the group of coupling, hinging, twisting, sliding, or flipping means adapted to achieve a durable seal in variable-conditions.

5. The flexible structure as defined in claim 1 further coupled to the container at its bottom end region.

6. The flexible structure as defined in claim 1 further coupled to the container at its intermediate section.

7. The flexible structure of claim 1 further comprising of extended flexible protrusions in various geometric designs, spheres, loops, lattices, structures or combinations.

8. The flexible structure of claim 1 is permanently or conditionally coupled to the container to achieve safe functionality and efficient manufacturing.

9. The flexible structure of claim 1 is made of food-safe materials, such as stainless steel, synthetic, silicone, plastic, fiber, synthetic and metal component structures, or any combination thereof.

10. An apparatus for infusing products comprising:
    a synthetic flexible structure having extended geometrical flexible protrusions; and
    a cylindrical or conical container with designed permeable sections on its side, bottom and top, having an interior cavity with designed shape and volume; and
    a container opening with an incorporated coupled sealing mechanism;
    the synthetic flexible structure having multitude of more than four geometrical flexible protrusions extended beyond the structure for counterbalancing the container within a vessel, wherein said flexible structure is coupled to the container at a top region, bottom region or intermediate section; further wherein said flexible structure surrounds the entire periphery of said container, wherein the extended geometrical flexible protrusions respond freely to forces by expanding and contracting, and said flexible protrusions are positioned to provide secure contact at a multitude of more than four locations within said vessel's interior, said container is adapted to receive and seal ingredients through its opening thereafter inserted into a vessel, where the flexible structure conforms to the interior of said vessel, ensuring secure contact with said multitude of locations in said vessel, ideal for infusion process.

11. The container of claim 10, is further comprising designed geometrical or non-conventional shapes, having an interior cavity of designed shape and volume.

12. The flexible structure of claim 10, is further comprising of food-safe materials, such as metal, silicone, plastic, synthetic materials, synthetic and metal component structures, or a combination thereof.

* * * * *